JOSEPH P. MESSINA
WILLIAM J. PIETRUCHA
INVENTORS

BY David H. Bobis
ATTY

United States Patent Office 3,490,064
Patented Jan. 13, 1970

3,490,064
BEARING AND MERCURY SEAL FOR THE SHAFTS
IN ROTARY DEVICES SUCH AS PUMPS
Joseph P. Messina, Springfield, and William J. Pietrucha,
River Edge, N.J., assignors to Worthington Corporation, Harrison, N.J., a corporation of Delaware
Filed Mar. 27, 1968, Ser. No. 716,599
Int. Cl. F16c 33/72; F16j 15/14
U.S. Cl. 308—36.3                                11 Claims

ABSTRACT OF THE DISCLOSURE

A shaft bearing and sealing means for shafts in rotary devices such as vertical dry pit centrifugal pumps and the like machines wherein a lubricated bearing for the shaft has a mechanical seal outboard thereof and a mercury seal inboard thereof; the bearing lubricant being sealed against leakage by the mechanical seal and the fluid handled by the rotary device being sealed against leakage by the mercury seal; and means operative to transmit the pressure of the fluid in the rotary device to one end of the mercury seal to balance the pressure of the fluid acting along the shaft being sealed by the mercury seal.

Background of the invention

This invention relates to rotary devices such as vertical dry pit centrifugal pumps in general and an improved bearing and effective shaft sealing means for these rotary devices in particular.

It is known that rotary devices such as pumps employ a packed type stuffing box or a mechanical shaft seal to maintain the liquid tight integrity of the pump chamber.

In these two arrangements the shaft bearings must be disposed outboard of the sealing means which leads to the requirement for longer shafts than if the bearings could be placed inboard of the sealing means. The longer shaft length requires a larger shaft diameter with larger bearings and bearing supports as a consequence thereof.

Packed type stuffing boxes require a constant supply of sealing fluid and careful adjustment of the packing gland to prevent scoring the shaft which would cause leakage. In addition, in packed type stuffing box arrangements for rotary devices the shaft length must be made relatively longer to provide for removal of the packing material from the stuffing box for replacement or repair of this type seal.

Where a mechanical shaft seal is used, a constant supply of clean, cool liquid for cooling, lubricating, and flushing purposes is required to remove foreign matter in contact with the mechanical seal faces and thus prevent scoring of the seal and eventual failure. This arrangement also requires a relatively long shaft length to provide for servicing.

Summary

The present invention covers a bearing and seal for the shaft of a rotary device such as a vertically disposed centrifugal pump including a casing forming a pump chamber, a shaft, and an impeller mounted on said shaft for rotation in the pumping chamber wherein the bearing and seal assembly disposed about the shaft at the point where it enters the casing includes a bearing means, means for lubricating the bearing, a mechanical seal outboard of said bearing to prevent leakage of bearing lubricant along said shaft, a mercury seal inboard of said bearing to prevent leakage of the pumped fluid; and means to transmit the discharge pressure of the fluid being pumped to the mercury seal to balance the pressure of the pumped fluid acting along the shaft.

Accordingly, it is an object of this invention to provide in a rotary device such as a vertically disposed centrifugal pump, an effective bearing, a mercury seal and a mechanical shaft seal combination to maintain liquid tight integrity of the casing for the rotary device wherein the mercury seal and not the mechanical seal seals against leakage of the pumped fluid and the mechanical seal seals against leakage of the bearing lubricant.

Another object of the invention is to eliminate the requirement for an external supply of water to the stuffing box or mechanical seal.

It is another object of this invention to locate the main shaft bearing inboard of the mechanical shaft seal in such rotary device or vertically disposed centrifugal pump thereby decreasing the required shaft length.

A further object of the invention is to provide for convenient access to the mechanical shaft seal for repair or replacement.

Still another object of the invention is to reduce shaft length and diameter thereby decreasing cost of construction.

Another object of the invention is to decrease the overall length of the rotary device.

The above and other objects and advantages of the invention are believed made clear by the following description thereof taken in conjunction with the accompanying detailed drawings.

Figure 1:
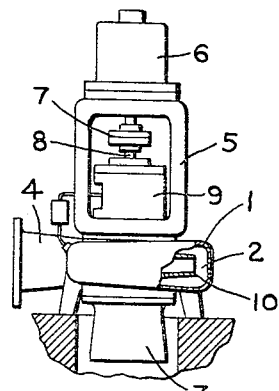
FIGURE 1 is a side elevation of the pump casing, seal and bearing housing, driver, drive support member, coupling, and pressure-equalizing chamber.
Figure 2:
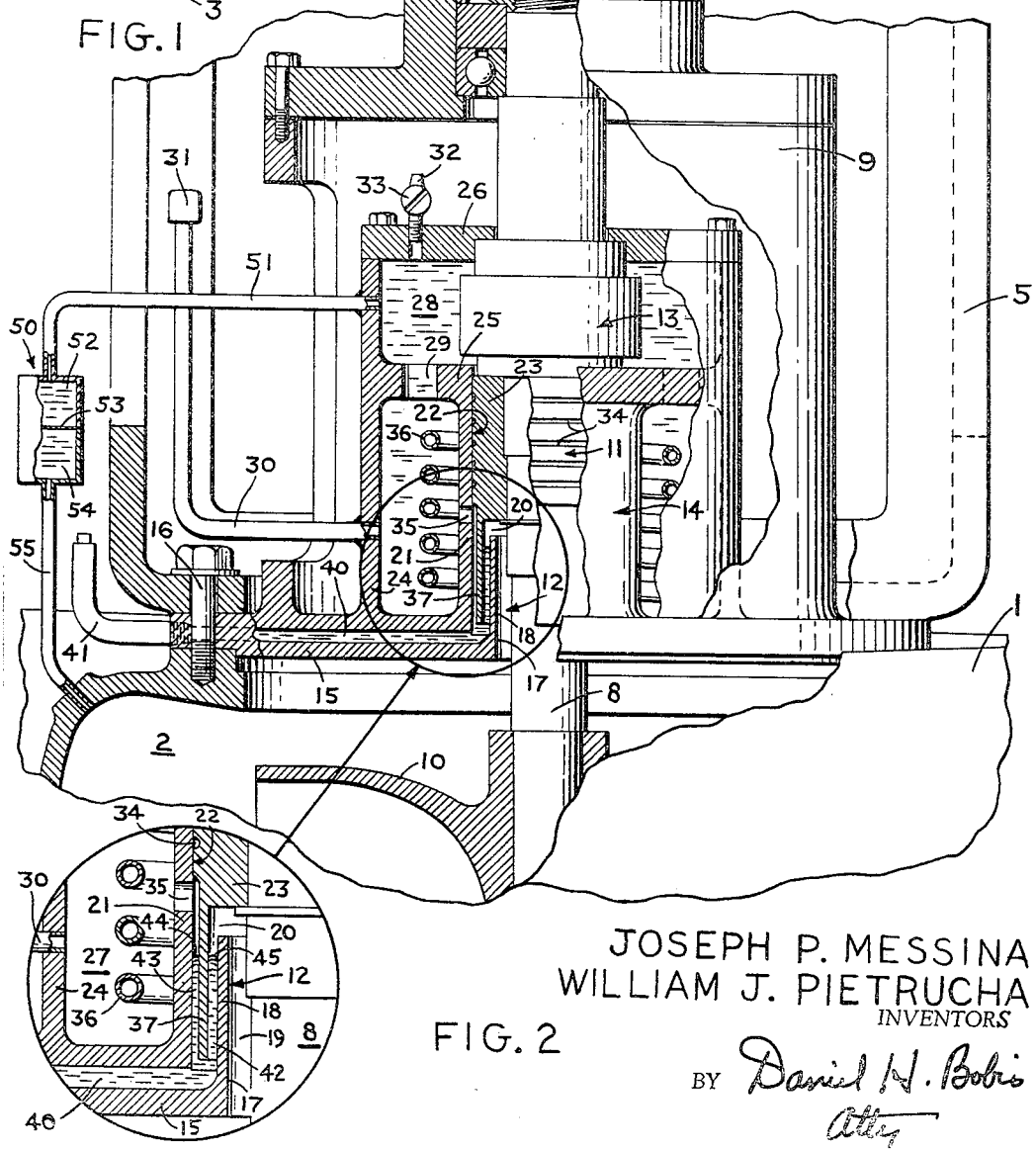
FIGURE 2 is a vertical cross section of the arrangement shown in FIGURE 1, with an enlarged insert of the mercury seal.

FIGURES 1 and 2 show a preferred form of rotary device for the present invention in the form of a vertical dry pit centrifugal pump, having a casing 1, a pumping chamber 2, a suction inlet 3 and a discharge outlet 4 for delivering the fluid to be pumped to any suitable point.

A support member of frame 5 connected to the casing 1 supports any suitable driving means shown generally at 6.

The driving means 6 is connected by a coupling means 7 to a shaft 8 which extends through a thrust bearing support member 9 and casing 1 into pumping chamber 2 where the shaft is connected at one end to an impeller 10 for rotating the impeller in the pumping chamber 2.

In the general operation of a centrifugal pump of the type described above, the fluid to be pumped from the pumping chamber 2, enters the suction inlet 3 and is passed by rotation of the impeller 10 to the discharge outlet 4 of the pump.

The operation of a centrifugal pump is well known to those skilled in this art and will require no further description.

The efficiency of a centrifugal pump of the type shown and described can be effected by leakage of the pumped fluid from the pumping chamber at the point where the pump shaft enters the pump casing.

In addition, leakage of lubricating fluid and other foreign matter into the pumping chamber at this same point may cause undesirable contamination of the fluid being pumped.

The bearing and seal for the shaft of the pump as herein illustrated is utilized to solve these problems and requires coaction between the main bearing generally designated 11, a mercury seal 12 and mechanical seal 13 as will now be described.

Main bearing and lubrication means therefor

Thus, in FIGURE 2 the bearing and seal housing and assembly generally designated 14 is shown to include a mounting or support plate or closure 15 which is connected between the pump casing 1 and the support member or frame 5 by threaded members 16.

The mounting and support plate or closure 15 serves to enclose the back portion of the casing 1 and is provided with an opening as at 17 through which the shaft 8 will extend to permit connecting one end thereof to the impeller 10 as above described.

About the opening 17 an inner upstanding or axially extending annular wall 18 is formed and is shown in FIGURE 2 the opening 17 and the upstanding wall 18 are disposed a spaced distance from the shaft 8 to form an annular passage 19 so that the fluid being pumped can pass about the shaft through the annular passage 19 to an annular space 20 which communicates with the mercury seal 12 more fully described below.

Concentric to the inner wall 18 and spaced a predetermined distance therefrom is an annular bearing support and wall 21 and this wall extends beyond and is axially longer than the inner wall 18. That portion of the concentric bearing support and wall 21 which is beyond the inner wall 18 has formed thereon the outer stationary bearing surface 22 which coacts with an inner bearing surface 23 mounted on and rotatable with the shaft 8.

An outer wall 24 concentric to the annular walls 18 and 21 coacts with a transverse partition means 25 connected between wall 21 and outer wall 24 and a closure member 26 to form an inner lubricant reservoir 27 and an outer lubricant reservoir 28 as is clearly shown in FIGURE 2 of the drawings.

The outer lubricant reservoir 28 communicates with the inner lubricant reservoir 27 through a plurality of openings one of which is shown at 29. Lubricant is delivered to the inner reservoir 27 through a lubricant filler means 30 having an easily accessible filling opening 31 to permit filling and adding lubricant to the inner reservoir as it may be required.

In order to be certain that a sufficient quantity of lubricant is delivered to the inner reservoirs 27 and outer reservoir 28, a filler valve 32 is provided having a thumb screw 33 thereon which permits the valve to be opened during the filling operation and closed when sufficient lubricant has been added to the respective reservoirs.

The outboard or upper end of the rotatable bearing 23 and stationary bearing 22 communicate with the upper reservoir 28 and rotatable bearing 23 is provided with a plurality of annular lubricant distributing grooves 34 so that lubricant in the upper or outer lubricant reservoir 28 will be transmitted between the rotatable bearing member 23 and stationary bearing member 22 when the pump is in operation.

Openings, one of which is shown at 35, in the bearing support and wall 21 below the coacting rotatable and stationary bearing members permits lubricant to return to the lower reservoir 27 as required during operation of the pump. The lubricant will be in contact with the mercury seal 12 as more fully described below.

In order to maintain the operating temperature of the lubricant so as to provide long bearing life and good operation of the mechanical seal 13, a cooling coil 36 is included in the lower or inner reservoir 27 and a suitable cooling medium can be transmitted through said cooling coils to and from any suitable source means (not shown).

Mechanical seal

To contain the lubricant within the inner reservoir 27 and outer reservoir 28, mechanical seal 13 is provided outboard of the main bearing 11.

Mechanical seals for this and other sealing purposes are well known in the art; as for example, the mechanical seal shown in U.S. Patent No. 2,873,127 to Pratt et al. entitled "Mechanical seal."

Accordingly, no further description of this device is thought to be necessary except as to the structural coaction and function may be set forth in the description of the operation set forth below.

Mercury seal

The rotatable bearing member 23 is provided with an annular extension 37 which as shown in FIGURE 2 projects in assembled position into the space between the inner wall 18 and the bearing support and wall 21 concentric thereto so that when mercury is introduced into this space through filler passage 40 in the mounting and support plate 15 by means of the filler tube 41 connected thereto for adding mercury from a point exterior of the pump casing 1, the annular extension or projection 37 forms a U-shaped mercury reservoir having an inner leg 42 and an outer leg 43 in communication with each other.

The openings 35 in the concentric bearing support and wall 21 permit lubricant from the inner reservoir 27 and outer reservoir 28 to be brought into contact and to transmit pressure to the annular outer end 44 of the mercury in the outer leg 43 of the U-shaped mercury reservoir. Similarly, the inner leg 42 of the mercury seal has the inner annular end 45 of the mercury therein disposed to communicate with the annular space 20 so that the fluid being pumped will contact and exert pressure against this annular end 45 of the mercury in the inner leg 42 of the mercury seal. To balance the pressure transmitted through the mercury, pressure will be transmitted to the lubricant acting on the outer annular end 44 of the outer leg 43 of the U-shaped mercury reservoir now to be described.

Pressure balancing means for mercury seal

One of the characteristics of the present invention is the fact that the pressure forces acting on the annular end 45 of the inner leg 42 of the U-shaped mercury reservoir of the mercury seal and the pressure forces acting on the annular end 44 of the outer leg 43 of the mercury seal are balanced to prevent leakage of the fluid being pumped.

In order to accomplish this, the discharge pressure acting in the pump chamber 2 is transmitted to the lubricant disposed in the respective inner reservoir 27 and outer reservoir 28.

This is accomplished by a transmitter means generally indicated 50. A first conduit or line 51 communicates at one end with the outer reservoir 28 and at the other end with an outer chamber 52 in the transmitter means 50. A flexible diaphragm 53 divides the transmitter means 50 into the said outer chamber 52 and inner chamber 54. Inner chamber 54 will in turn communicate with the pumped fluid being discharged through the discharge outlet 4 for the casing 1.

When the pump is in operation a quantity of fluid being pumped in substantially static condition will fill the second conduit 55 and inner chamber 54 of the transmitter means 50.

Similarly, a quantity of the lubricant acting in the respective inner reservoir 27 and outer reservoir 28 will fill the first conduit 51 and the outer chamber 52 of the transmitter means 50.

Since the discharge pressure of the fluid being pumped will be transmitted equally through the fluid, the discharge pressure acting in the pumped fluid will be transmitted by the diaphragm 53 to the lubricant in outer chamber 52 and conduit 51. This pressure will in turn be transmitted uniformly through the lubricant in the outer reservoir 28, inner reservoir 27 and the lubricant acting through openings 35 on the annular end 44 of the mercury in the outer leg 43 of the mercury seal 12.

Operation

When the rotary device or pump is in operation and fluid is being pumped from the discharge outlet 4 as above described, the pumped fluid will pass through annular passage 19 and annular spaces 20 until it contacts the annular end 45 of the mercury in inner leg 42 of the U-shaped mercury reservoir of the mercury seal 12.

Simultaneously, the discharge pressure acting in the fluid in pump chamber will be transmitted by the transmitter means 50 to the lubricant acting on the annular end 44 of the mercury in the outer leg 43 of the mercury seal 12 so that the pressure acting across the U-shaped mercury reservoir of the mercury seal 12 will be balanced to prevent and seal against leakage of the pumped fluid.

The lubricant in the inner reservoir 27 and outer reservoir 28 communicating therewith will be adjusted to the proper temperature as required by the cooling fluid in the cooling means 36. Lubricant will automatically feed to the main bearing lubricant grooves 34 and will be sealed from leakage across the shaft by the mechanical seal means 13 outboard of the main bearing 11.

Thus, we have disclosed a combined lubricated bearing, and mercury seal arrangement for a rotary device which serves to eliminate the standard or conventional stuffing box type seal or oil lubricated mechanical seals arrangement and to provide numerous advantages in the design of necessary elements and the overall rotary device.

It will be understood that the invention is not to be limited to the specific construction or arrangement of parts shown but that they may be widely modified within the invention defined by the claims.

What is claimed is:

1. In a rotary device for handling fluid under pressure including a shaft, the combination therewith of:
    a main bearing fixedly connected to and rotatable with said shaft;
    means for lubricating said main bearing;
    mechanical seal means to prevent leakage of lubricant from said lubricating means along said shaft;
    and a mercury seal to prevent leakage of fluid from said rotary device operatively associated with said means for lubricating the main bearing wherein said mercury seal are operatively associated to form a U-shaped reservoir.

2. In a rotary device as claimed in claim 1 wherein said mechanical seal is outboard of the main bearing and said mercury seal is inboard of the main bearing.

3. In a rotary device as claimed in claim 1 wherein said U-shaped reservoir includes a first leg and a second leg, said first leg disposed to seal said fluid being handled by the rotary device against leakage along the shaft, and said second leg disposed to communicate with said lubricating fluid in the lubrication means for balancing the pressure of fluid leaking across said shaft.

4. In a rotary device as claimed in claim 1 having means for transmitting the pressure of the fluid being handled by said rotary device, and said means connected to said mercury seal to balance the pressure of fluid leaking across said shaft.

5. In a rotary device as claimed in claim 1 having means for transmitting the pressure of fluid being handled by said rotary device, said means connected to said lubricating means to transmit the pressure of said fluid to the lubricant in said lubricating means.

6. In a rotary device as claimed in claim 1 having a cooling means, said cooling means mounted in the means for lubricating the main bearing to cool and maintain the lubricant in said lubricant reservoir at optimum operating temperature.

7. In a rotary device for handling fluid having a shaft:
    a bearing means for said shaft;
    means to lubricate said bearing means;
    means for transmitting the pressure of the fluid being handled by said rotary device to the lubricant in said lubricating means;
    a seal means disposed to coact with said bearing means; said seal means including:
        a mechanical seal outboard of said bearing means for sealing lubricant from leakage along the shaft;
        a mercury seal inboard of said bearing means and disposed to communicate at one end with the fluid being handled by said pump so as to seal the same from leakage across said shaft, said bearing means and said mercury seal operatively associated to form a U-shaped reservoir;
        said mercury seal operatively connected at the other end to said lubricating means and to communicate with the lubricant therein to permit said lubricant to balance the pressure of the fluid acting against said one end of the mercury seal.

8. A bearing and a mercury seal to prevent leakage of fluid along the shaft of a rotary device comprising:
    a resorvoir for mercury disposed about said shaft;
    a bearing means fixedly connected to and rotatable with said shaft;
    an axially extending member on said bearing operatively associated with said reservoir to form a U-shaped space therein including a first leg and a second leg;
    the mercury in said first leg in communication with the fluid to be sealed; and
    equalizing means in communication with the mercury in said second leg to balance the pressure acting in said reservoir.

9. The combination of claim 8 wherein said equalizing means includes:
    a lubricant reservoir for lubricating said bearing.

10. The combination of claim 9 including a mechanical seal means to prevent leakage of lubricant along said shaft.

11. The combination of claim 9 wherein said equalizing means includes a means for transmitting pressure of said fluid to be sealed to said lubricant reservoir.

References Cited

UNITED STATES PATENTS

| | | | |
|---|---|---|---|
| 714,007 | 11/1902 | Mittag | 308—172 X |
| 1,150,485 | 8/1915 | Bentley | 308—36.3 X |
| 1,699,770 | 1/1929 | Voss | 308—36.3 X |
| 1,879,625 | 9/1932 | Mendenhall | 308—36.3 X |
| 1,879,627 | 9/1932 | Mendenhall | 308—36.3 |
| 1,945,833 | 2/1934 | Swanson | 308—168 |
| 2,390,332 | 12/1945 | Schmidt | 308—36.3 |
| 2,667,127 | 1/1954 | Rimann. | |
| 2,814,449 | 11/1957 | Wieczorek | 308—36.1 X |
| 2,901,294 | 8/1959 | Smith | 308—36.1 |
| 3,076,684 | 2/1963 | Todtenhaup | 308—36.3 X |

MARTIN P. SCHWADRON, Primary Examiner

L. L. JOHNSON, Assistant Examiner

U.S. Cl. X.R.

308—76, 134.1